United States Patent Office 3,773,906
Patented Nov. 20, 1973

3,773,906
MANUFACTURE OF AQUEOUS AMMONIUM
IODIDE SOLUTIONS
Rolf Platz, Mannheim, and Werner Fuchs and Guenther Schoenaich, Ludwigshafen, Germany, assignors to Badische Anilin- & Soda-Fabrik Aktiengesellschaft, Ludwigshafen (Rhine), Germany
No Drawing. Filed Mar. 7, 1972, Ser. No. 232,523
Int. Cl. C01c 1/16
U.S. Cl. 423—470    4 Claims

ABSTRACT OF THE DISCLOSURE

Aqueous ammonium iodide solutions are obtained by quenching the gaseous reaction mixture resulting from the reaction, at from 300 to 1,000° C., of iodine with ammonia in an excess of from 10 to 20 times molar, with water at temperatures above 70° C.

---

This invention relates to a process for the manufacture of aqueous ammonium iodide solutions by reducing elementary iodine in the gas phase.

In many industrial processes, particularly those involving dehydrogenation of hydrocarbon compounds, elementary iodine or ammonium iodide, which converts to elementary iodine under the action of oxygen, is used as catalyst. At the end of the reaction the iodine is generally in the form of unreacted ammonium iodide, hydrogen iodide, elementary iodine and organic iodine compounds. Since iodine is expensive, it is particularly important to be able to work up the iodine compounds, particularly the latter, into ammonium iodide or its aqueous solution and can be recycled to the process.

The reconversion of organic iodine compounds, particularly alkyl iodides, to the corresponding ammonium salts or solutions thereof has previously been effected in industry by burning the organic iodine compounds with oxygen and reducing the emerging reaction gases, which generally consist of oxidation products of hydrocarbons, nitrogen and free iodine, by treating them with hydrazine-containing ammonia solution to form hydrogen iodide or ammonium iodide, the resulting solution being concentrated and recycled to the process. However, the use of hydrazine in such industrial processes is not a cheap way of solving the problem, as hydrazine is still a relatively expensive substance. Moreover, a constant supply of fresh hydrazine is necessary, since this reducing agent is consumed during the said working-up process. It is thus commercially desirable, particularly in the said industry involving the dehydrogenation of organic compounds, to find a way of reconverting the organically combined iodine portions to ammonium iodide in a cheap process.

The complex nature of iodine recovery makes it possible to divide the recovery process into substantially two steps, the first step being the combustion of the organic iodine components to form elementary iodine. This step requires no improvement. Thus, the actual problem to be solved is to find a simple way of converting elementary iodine to ammonium iodide or aqueous solutions thereof by reduction.

The process now surprisingly discovered, by which ammonium iodide or aqueous solutions thereof may be prepared by reducing elementary iodine in the gas phase followed by quenching of the reduction gases with water, is characterized in that a gas mixture containing iodine vapor and an excess of ammonia of from 10 to 20 times molar as reducing agent is subjected to a temperature of from 300° to 1,000° C. and the resulting gaseous reaction mixture is quenched with water at temperatures above 70° C.

This extraordinarily simple solution has not been previously considered as a commercial proposition, as numerous prejudices from chemical experts stand against it. It is well known that the reaction of ammonia with iodine generally produces nitrogen iodide (see Gmelin's Handbuch der Anorganischen Chemie, 8th edition, System No. 8, p. 593). This nitrogen iodide, which strictly speaking is an addition compound of nitrogen iodide of ammonia, tends to disintegrate explosively into the separate elements. The lower homolog bromine reacts with ammonia to form ammonium bromide, but this reaction is also of an explosive nature, i.e. it is particularly difficult to control in a large-scale process, since cooling of the system is impossible on account of the large amount of heat which is generated. Thus there has been no desire to carry out any experiments in this direction. It is thus extremely surprising that experiments of this kind carried out at the temperatures stated of from 300° to 1,000° C. achieve the success described above.

Another surprising feature of this reaction is that it can be carried out in the presence of oxygen without, as one would have expected, this element causing oxidation of the ammonia to nitrogen or of any hydrogen iodide formed back to iodine.

The process is simple to carry out and is effected, for example, by mixing iodine in a dilute form with gaseous ammonia in an excess of from about 10 to 20 times molar and reacting these components at from 300° to 1,000° C. The reaction gas is then quenched at temperatures above 70° C. This quenching temperature must be strictly observed, since at temperatures below 70° C. the nitrogen iodide/ammonia addition product described in the literature is liable to form as a by-product and cause violent explosions. However, the process is completely safe when carried out above 70° C.

Gases suitable for diluting the iodine are all gases which do not interfere with the course of the reaction in any way. Such gases are those which are inert under the conditions of the reaction, for example nitrogen, the noble gases, combustion gases from organic oxidizing reactions such as carbon dioxide, and steam. Hydrocarbons are also non-interfering. Small amounts of hydrocarbons such as sometimes occur in the off-gas of the aforementioned industrial processes do not interfere with the course of the reaction, as the reduction of iodine by ammonia is an independent reaction and the oxygen serves a purpose which has nothing to do with said reaction. As stated above, oxygen does not interfere with the reaction. As may be seen from the following examples, the presence of oxygen, strangely enough, may even slightly improve the yield of ammonium iodide, as is verified by other experiments. No reasonable explanation has as yet been found for this remarkable phenomenon.

Preferably, the reaction of the invention is carried out by evaporating iodine, for example, with from about 5 to 10 times its weight of nitrogen over a period dependent on the initial weight of the iodine and reacting the iodine vapor with from about 10 to 20 times its weight of ammonia gas and from 10 to 20 times its weight of oxygen in a quartz coil heated to from about 300° to 1,000° C. and preferably from 450° to 800° C. The reaction time (calculated on the volume of the quartz coil under the conditions of the reaction) is from 1 to 5 seconds and preferably from 2 to 3 seconds for a batch in which about 25 g. of iodine are reacted. The reaction gas leaving the reactor is then quenched with hot water having a temperature of from about 70° to 100° C. The resulting solution can then be extracted with, say, xylene for the removal of unreacted iodine. The residual iodine thus extracted is generally less than 10% of the total amount of iodine. The temperature may vary between 300° and 1,000° C., the preferred range being from 450° to 800° C. Within these temperature limits the yields vary only slightly. The best results are obtained at temperatures near about 600° C.

Our new process permits iodine combined in organic compounds to be reconverted in a very simple manner to ammonium iodide used as the starting material of a number of processes. A particularly important application of the process of the invention is its use in the so-called oxydehydrogenation processes.

A large number of saturated organic compounds can be converted to the corresponding unsaturated compounds at elevated temperatures with oxygen or oxygen-containing gases, particularly air, under the catalytic action of halogen, in particular, iodine. In these oxydehydrogenations, the iodine used as catalyst is usually fed to the reactor in the form of ammonium iodide together with the compound to by dehydrogenated as it leaves the reactor together with the reaction products in the form of elementary iodine, hydrogen iodide and organically combined iodine. The problem of recovering the iodine in the form of ammonium iodide has previously been solved in industry by quenching the reaction gas, which also contains the unsaturated compound formed, for example methyl methacrylate (from isobutyrate), with an aqueous ammonia solution containing an amount of hydrazine sufficient to reduce the elementary halogen. The two first-named portions, i.e. the unconsumed ammonium iodide itself and the elementary iodine directly formed in the reaction gas, are reduced with hydrazine, as otherwise the organic reaction product of the dehydrogenation reaction would be destroyed if this reaction gas were subjected to the process of the present invention. This becomes clearer when one considers that an unsaturated organic compound, when subjected to temperatures of about 600° C., may be chemically modified or, if excess oxygen is present, oxidized.

The organically combined iodine has previously been worked up, according to the prior U.S. patent application Ser. No. 757,938, filed by Rolf Platz and Karl Gerhard Baur, on Sept. 6, 1968, which has now matured into U.S. Pat. 3,592,600, issued July 13, 1971, by separating it from the quenched reaction product by distillation and then burning it in a muffle furnace. The product of this combustion, which contains elementary iodine, is then quenched with hydrazine-containing ammonia and the iodine thus converted to ammonium iodide.

In the process of the present invention, the combustion gas is passed directly to a reactor, e.g. the aforementioned quartz coil, and mixed with the specified excess of ammonia and possibly also oxygen to give a yield of from about 90 to 100% of iodine in the form of ammonium iodide (as an aqueous solution).

The invention is illustrated below with reference to the following examples.

EXAMPLE 1

23 g. of iodine were evaporated by means of 82 l. of nitrogen over 90 minutes and reacted with 33 l. of ammonia gas and 33 l. of oxygen in a quartz coil heated at 600° C. The reaction time (based on the volume of the quartz coil under the conditions of the reaction) was 2.5 seconds. The reaction gas leaving the reactor was quenched with water having a temperature of more than 80–90° C.

For the purposes of analysis, the resulting solution was extracted with xylene to remove the elementary iodine. Titration with sodium thiosulfate gave 1.95 g. of elementary iodine. To the aqueous solution there was added an excess of silver nitrate solution and the consumption of silver nitrate was back titrated with ferric ammonium thiocyanate, from which the amount of iodide was calculated to be 20.71 g., i.e. 90% of the iodine introduced had been reduced to iodide (ammonium iodide).

EXAMPLES 2 TO 7

The results of further experiments carried out under identical conditions but at different temperatures are given in the following table.

TABLE

[Test on the reduction of iodine with ammonia in the presence of oxygen (based on an initial weight of iodine of 23 g.)]

| Temperature (° C.) | Iodine distribution | | Yield of iodine (percent) |
|---|---|---|---|
| | Iodine (g.) | Iodide (g.) | |
| Example: | | | |
| 2 | 450 | 1.77 | 21.05 | 91.5 |
| 3 | 600 | 0.25 | 22.44 | 97.5 |
| 4 | 600 | 0.64 | 22.10 | 96.0 |
| 5 | 600 | 0.90 | 21.87 | 95.2 |
| 6 | 740 | 0.19 | 22.51 | 97.8 |
| 7 | 800 | 1.30 | 21.42 | 93.1 |

We claim:

1. A process for the preparation of an aqueous ammonium iodide solution by reducing elementary iodine in the gas phase followed by quenching with water, wherein a gas mixture containing iodine vapor and an excess of ammonia of from 10 to 20 times molar as reducing agent is subjected to a temperature of from 300° C. to 1,000° C. and the resulting gaseous reaction mixture is quenched with water at temperatures above 70° C.

2. A process as set forth in claim 1, wherein the said gas mixture also contains oxygen in a molar excess of from about 10 to 20 times over the iodine.

3. The application of the process as set forth in claim 1 to the recovery of iodine in the form of aqueous ammonium iodide from combustion gases containing elementary iodine and obtained as the combustion products of the alkyl iodide portion of the reaction gases produced in an oxydehydrogenation process.

4. A process as set forth in claim 1 wherein said gas mixture is subjected to a temperature of from 450° to 800° C.

References Cited

UNITED STATES PATENTS 1,907,975   5/1933   Jones _____ 423—470
3,592,600   7/1971   Platz et al. _____ 423—470

EDWARD STERN, Primary Examiner

U.S. Cl. X.R.

423—471

UNITED STATES PATENT OFFICE
CERTIFICATE OF CORRECTION

Patent No. 3,773,906  Dated November 20, 1973

Inventor(s) Rolf Platz & Werner Fuchs & Guenther Schoenaich

It is certified that error appears in the above-identified patent and that said Letters Patent are hereby corrected as shown below:

Column 1, line eight, insert
-- 30    Foreign Application Priority Data
         March 13, 1971    Germany . . . . P 21 12 127.7 --

Column 4, Table, column 5 heading, "Yield of iodine" should read -- Yield of iodide --.

Signed and sealed this 15th day of October 1974.

(SEAL)
Attest:

McCOY M. GIBSON JR.        C. MARSHALL DANN
Attesting Officer          Commissioner of Patents